US008503572B2

(12) United States Patent
Luo et al.

(10) Patent No.: US 8,503,572 B2
(45) Date of Patent: Aug. 6, 2013

(54) ANTENNA VIRTUALIZATION IN A WIRELESS COMMUNICATION ENVIRONMENT

(75) Inventors: Xiliang Luo, San Diego, CA (US); Amir Farajidana, San Diego, CA (US); Xiaoxia Zhang, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 431 days.

(21) Appl. No.: 12/697,689

(22) Filed: Feb. 1, 2010

(65) Prior Publication Data

US 2010/0202560 A1    Aug. 12, 2010

Related U.S. Application Data

(60) Provisional application No. 61/149,325, filed on Feb. 2, 2009.

(51) Int. Cl.
    *H04L 27/00* (2006.01)
(52) U.S. Cl.
    USPC .......................................... 375/299; 375/295
(58) Field of Classification Search
    USPC ......................................................... 375/299
    See application file for complete search history.

(56) References Cited

U.S. PATENT DOCUMENTS

| 7,450,532 | B2 | 11/2008 | Chae et al. | |
|---|---|---|---|---|
| 2006/0233131 | A1 | 10/2006 | Gore et al. | |
| 2007/0041457 | A1* | 2/2007 | Kadous et al. | 375/260 |
| 2008/0287075 | A1 | 11/2008 | Kim et al. | |
| 2010/0034299 | A1* | 2/2010 | Love et al. | 375/260 |
| 2010/0075686 | A1* | 3/2010 | Bhattad et al. | 455/450 |
| 2011/0064156 | A1* | 3/2011 | Kim et al. | 375/267 |
| 2012/0134334 | A1* | 5/2012 | Ko et al. | 370/329 |

FOREIGN PATENT DOCUMENTS

| JP | 2003534705 A | 11/2003 |
|---|---|---|
| KR | 20080022033 A | 3/2008 |
| RU | 2321949 C1 | 4/2008 |
| WO | 0191318 A1 | 11/2001 |
| WO | 2005055465 A1 | 6/2005 |

(Continued)

OTHER PUBLICATIONS

International Search Report and Written Opinion—PCT/US2010/022894, International Searching Authority—European Patent Office, Apr. 7, 2010.

(Continued)

*Primary Examiner* — Erin File
(74) *Attorney, Agent, or Firm* — Kenyon S. Jenckes

(57) ABSTRACT

Systems and methodologies are described that facilitate performing antenna virtualization in a wireless communication environment. A set of physical transmit antennas can be partitioned into a plurality of groups of physical transmit antennas. Further, a precoding vector for a particular group of physical transmit antennas from the plurality of groups of physical transmit antennas can be formulated. Moreover, the particular group of physical transmit antennas can form a particular virtual antenna. By way of another example, a disparate precoding vector for a disparate group of physical transmit antennas from the plurality of groups of physical transmit antennas can be formulated, and the disparate group of physical transmit antennas can form a disparate virtual antenna. The precoding vector can be applied to a signal for transmission over the particular virtual antenna, and the disparate precoding vector can be applied to a disparate signal for transmission over the disparate virtual antenna.

24 Claims, 12 Drawing Sheets

(56) References Cited

FOREIGN PATENT DOCUMENTS

| WO | 2006088400 A1 | 8/2006 |
|---|---|---|
| WO | 2006113872 A1 | 10/2006 |
| WO | 2007027825 A2 | 3/2007 |
| WO | WO2007024913 A1 | 3/2007 |
| WO | WO2007027825 | 3/2007 |
| WO | 2008021008 A2 | 2/2008 |
| WO | WO2008030035 A2 | 3/2008 |
| WO | 2008134551 A1 | 11/2008 |
| WO | 2010053664 A2 | 5/2010 |

OTHER PUBLICATIONS

Ericsson: "High Delay CDD in Rank Adapted Spatial Multiplexing Mode for LTE DL", R1-072461, 3GPP RAN WG1 #49 meeting, May 7, 2007, pp. 1-8.

QUALCOMM Europe: "DL Higher Order MIMO in LTE-A", R1-083815, 3GPP RAN WG1 #54bis meeting Sep. 29, 2008, pp. 1-3.

Motorola: "Downlink Multiple Antenna Schemes for LTE-Advanced" 3GPP Draft; R1-083228 LTE-A DL MIMO Motorola, 3rd Generation Partnership Project (3GPP), Mobile Competence Centre; 650, Route Des Lucioles; F-06921 Sophia-Antipolis Cedex; France, No. Jeju; Aug. 12, 2008, XP050316642 [retrieved on Aug. 12, 2008] p. 1, paragraph 1-p. 2, paragraph 3.

Nortel: "RS design considerations for high-order MIMO in LTE-A" TSG-RAN1 #54, R1-083157, [Online] Aug. 12, 2008, pp. 1-6, XP002561739 Retrieved from the Internet: URL:http://www.3gpp.org/ftp/tsg-ran/WGI-RL I/TSGRI_54/Docs/> [retrieved on 2009-12-291 p. 2-page 5.

NTT DoCoMo et al., "Adaptive Beamforming in E-UTRA", 3GPP TSG-RAN WG1#48, R1-070859, Feb. 16, 2007.

Taiwan Search Report—TW099103056—TIPO—May 2, 2013.

* cited by examiner

ANTENNA VIRTUALIZATION IN A WIRELESS COMMUNICATION ENVIRONMENT

CROSS-REFERENCE TO RELATED APPLICATIONS

This application claims the benefit of U.S. Provisional Patent Application Ser. No. 61/149,325 entitled "A METHOD AND APPARATUS FOR MAPPING VIRTUAL ANTENNA'S IN A WIRELESS COMMUNICATION SYSTEM" which was filed Feb. 2, 2009. The entirety of the aforementioned application is herein incorporated by reference.

BACKGROUND

I. Field

The following description relates generally to wireless communications, and more particularly to implementing antenna virtualization in a wireless communication system.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, . . . ). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple user equipments (UEs). Each UE can communicate with one or more base stations via transmissions on forward and reverse links. The forward link (or downlink) refers to the communication link from base stations to UEs, and the reverse link (or uplink) refers to the communication link from UEs to base stations. This communication link can be established via a single-in-single-out, a multiple-in-single-out or a multiple-in-multiple-out (MIMO) system.

MIMO systems commonly employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which can be referred to as spatial channels, where $N_S \leq \{N_T, N_R\}$. Each of the $N_S$ independent channels corresponds to a dimension. Moreover, MIMO systems can provide improved performance (e.g., increased spectral efficiency, higher throughput and/or greater reliability) if the additional dimensionalities created by the multiple transmit and receive antennas are utilized.

MIMO systems can support various duplexing techniques to divide forward and reverse link communications over a common physical medium. For instance, frequency division duplex (FDD) systems can utilize disparate frequency regions for forward and reverse link communications. Further, in time division duplex (TDD) systems, forward and reverse link communications can employ a common frequency region so that the reciprocity principle allows estimation of the forward link channel from the reverse link channel.

Wireless communication systems oftentimes employ one or more base stations that provide a coverage area. A typical base station can transmit multiple data streams for broadcast, multicast and/or unicast services, wherein a data stream may be a stream of data that can be of independent reception interest to a UE. A UE within the coverage area of such base station can be employed to receive one, more than one, or all the data streams carried by the composite stream. Likewise, a UE can transmit data to the base station or another UE.

A wireless communication apparatus (e.g., UE, base station, . . . ) can be equipped with a plurality of physical transmit antennas. Oftentimes, respective signals are provided to utilize the plurality of physical transmit antennas. Thus, for instance, four signals can be provided to employ four physical transmit antennas (e.g., each physical transmit antenna sends a respective one of the four signals, . . . ). However, significant overhead can result from the foregoing. Moreover, employment of a subset of the plurality of physical transmit antennas can result in inefficient utilization of the physical transmit antennas, power amplifiers (PAs) associated with the physical transmit antennas, and so forth. According to another illustration, a receiving wireless communication apparatus (e.g., UE, base station, . . . ) can be unable to receive and/or process the plurality of signals sent by the plurality of physical transmit antennas. Following this illustration, the number of physical transmit antennas with which the wireless communication apparatus is equipped can exceed a number of physical transmit antennas supported by the receiving wireless communication apparatus.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating performance of antenna virtualization in a wireless communication environment. A set of physical transmit antennas can be partitioned into a plurality of groups of physical transmit antennas. Further, a precoding vector for a particular group of physical transmit antennas from the plurality of groups of physical transmit antennas can be formulated. Moreover, the particular group of physical transmit antennas can form a particular virtual antenna. By way of another example, a disparate precoding vector for a disparate group of physical transmit antennas from the plurality of groups of physical transmit antennas can be formulated, and the disparate group of physical transmit antennas can form a disparate virtual antenna. The precoding vector can be applied to a signal for transmission over the particular virtual antenna, and the disparate precoding vector can be applied to a disparate signal for transmission over the disparate virtual antenna.

According to related aspects, a method that facilitates implementing antenna virtualization in a wireless communication environment is described herein. The method can include partitioning a set of physical transmit antennas into a plurality of groups of physical transmit antennas. Further, the method can include formulating a precoding vector for a particular group of physical transmit antennas from the plurality of groups of physical transmit antennas, the particular group of physical transmit antennas forms a particular virtual antenna. Moreover, the method can comprise applying the precoding vector to a signal for transmission over the particular virtual antenna.

Another aspect relates to a wireless communications apparatus. The wireless communications apparatus can include a memory that retains instructions related to partitioning a set of physical transmit antennas into a plurality of groups of physical transmit antennas, generating a precoding vector for a particular group of physical transmit antennas from the plurality of groups of physical transmit antennas, wherein the particular group of physical transmit antennas forms a particular virtual antenna, and applying the precoding vector to a signal for transmission over the particular virtual antenna. Further, the wireless communications apparatus can include a processor, coupled to the memory, configured to execute the instructions retained in the memory.

Yet another aspect relates to a wireless communications apparatus that enables effectuating antenna virtualization in a wireless communication environment. The wireless communications apparatus can include means for partitioning a set of physical transmit antennas into a plurality of groups of physical transmit antennas, each of the groups corresponds to a respective virtual antenna. Further, the wireless communications apparatus can comprise means for generating respective precoding vectors for the plurality of groups of physical transmit antennas. Moreover, the wireless communications apparatus can include means for implementing precoding upon signals for transmission using the respective precoding vectors.

Still another aspect relates to a computer program product that can comprise a computer-readable medium. The computer-readable medium can include code for partitioning a set of physical transmit antennas into a plurality of groups of physical transmit antennas, each of the groups corresponds to a respective virtual antenna. Moreover, the computer-readable medium can include code for generating respective precoding vectors for the plurality of groups of physical transmit antennas. Further, the computer-readable medium can include code for implementing precoding upon signals for transmission using the respective precoding vectors.

In accordance with another aspect, a wireless communications apparatus can include a processor, wherein the processor can be configured to partition a set of physical transmit antennas into a plurality of groups of physical transmit antennas. Moreover, the processor can be configured to formulate a precoding vector for a particular group of physical transmit antennas from the plurality of groups of physical transmit antennas, the particular group of physical transmit antennas forms a particular virtual antenna. Further, the processor can be configured to apply the precoding vector to a signal for transmission over the particular virtual antenna.

Toward the accomplishment of the foregoing and related ends, the one or more embodiments comprise the features hereinafter fully described and particularly pointed out in the claims. The following description and the annexed drawings set forth herein detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
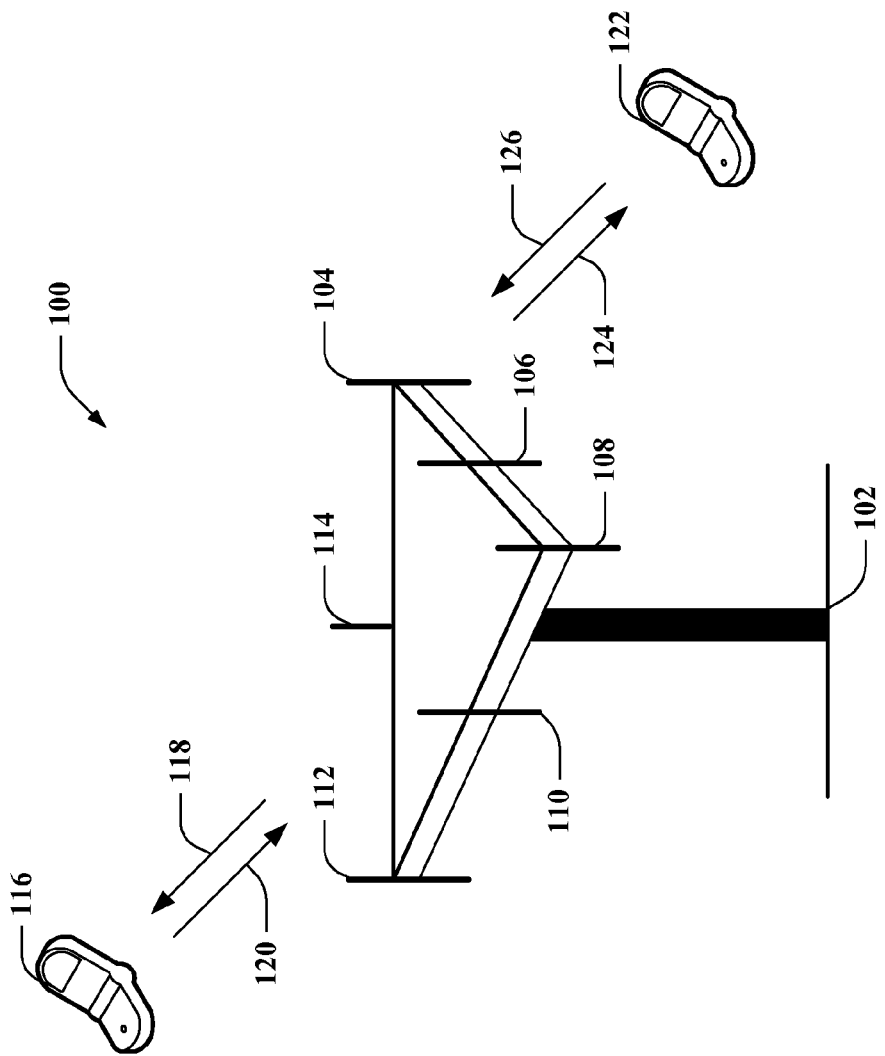
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits UEs in terms of transmit power efficiency. Accordingly, SC-FDMA can be implemented as an uplink multiple access scheme in 3GPP Long Term Evolution (LTE) or Evolved UTRA.

Furthermore, various embodiments are described herein in connection with a user equipment (UE). A UE can also be called a system, subscriber unit, subscriber station, mobile station, mobile, remote station, remote terminal, mobile device, user terminal, terminal, wireless communication device, user agent, user device, or access terminal. A UE can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with UE(s) and can also be referred to as an access point, Node B, Evolved Node B (eNodeB, eNB) or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more user equipments (UEs) such as UE 116 and UE 122; however, it is to be appreciated that base station 102 can communicate with substantially any number of UEs similar to UEs 116 and 122. UEs 116 and 122 can be, for example, cellular phones, smart phones, laptops, handheld communication devices, handheld computing devices, satellite radios, global positioning systems, PDAs, and/or any other suitable device for communicating over system 100. As depicted, UE 116 is in communication with antennas 112 and 114, where antennas 112 and 114 transmit information to UE 116 over a forward link 118 and receive information from UE 116 over a reverse link 120. Moreover, UE 122 is in communication with antennas 104 and 106, where antennas 104 and 106 transmit information to UE 122 over a forward link 124 and receive information from UE 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to UEs in a sector of the areas covered by base station 102. In communication over forward links 118 and 124, the transmitting antennas of base station 102 can utilize beamforming to improve signal-to-noise ratio of forward links 118 and 124 for UEs 116 and 122. Also, while base station 102 utilizes beamforming to transmit to UEs 116 and 122 scattered randomly through an associated coverage, UEs in neighboring cells can be subject to less interference as compared to a base station transmitting through a single antenna to all its UEs.

According to an example, a UE (e.g., UE 116, UE 122, . . . ) can include multiple physical transmit antennas. Conventional UEs oftentimes include one physical transmit antenna; thus, such common UEs typically send a signal over the one physical transmit antenna. In contrast, UE 116 and/or UE 122 can include multiple physical transmit antennas (e.g., two, four, any integer greater than 1, . . . ). For instance, UE 116 and/or UE 122 can be Long Term Evolution—Advanced (LTE-A) UEs, which include the multiple physical transmit antennas.

UE 116 and/or UE 122 can create virtual antenna(s) by implementing precoding. Establishing virtual antenna(s) by applying precoding can enable utilizing power amplifiers (PAs) associated with the multiple physical transmit antennas efficiently while transmitting over the virtual antenna(s). By way of illustration, a UE (e.g., UE 116, UE 122, . . . ) can include two physical transmit antennas, each of which can be associated with a respective PA. If a virtual antenna is not established and the UE has one signal to send over one of the two physical transmit antennas, then one of the two PAs is utilized while the other PA remains unused; hence, resources of the UE are inefficiently employed. Instead, the UE can virtualize the two physical transmit antennas to be a single virtual antenna. Further, the UE can send one signal over the single virtual antenna, which leads to the signal being transmitted over the two physical transmit antennas using the two PAs associated therewith. Accordingly, resources of the UE can be more efficiently utilized as compared to conventional techniques that fail to leverage virtual antenna(s). Moreover, the two physical transmit antennas that form the virtual antenna can appear to be a single antenna from an offsite point of view (e.g., from a perspective of base station 102 which receives the signal from the UE, . . . ). It is to be appreciated, however, that the claimed subject matter is not limited to the aforementioned illustration.

By way of another example, base station 102 can include multiple physical transmit antennas. The number of physical transmit antennas of base station 102 can be larger than a number of antennas advertised to UE 116 and/or UE 122 (e.g., legacy UE(s), LTE-A UE(s), . . . ). Thus, base station 102 can implement antenna virtualization to benefit from full power utilization of PAs associated with the multiple physical transmit antennas and to allow for legacy compatible design.

As set forth herein, a wireless communication apparatus (e.g., base station 102, UE 116, UE 122, . . . ) can establish virtual antenna(s) from a plurality of physical transmit antennas. Moreover, antenna virtualization can be transparent to a receiving wireless communication apparatus (e.g., UE 116, UE 122, base station 102, . . . ); thus, the receiving wireless communication apparatus can be unaware of antenna virtualization being effectuated by the wireless communication apparatus, precoding performed by the wireless communication apparatus, and the like. For example, formation of virtual antenna(s) by base station 102 can be transparent to UE 116 and/or UE 122. Similarly, for instance, establishment of virtual antenna(s) by a UE (e.g., UE 116, UE 122, . . . ) can be transparent to base station 102.

By way of another example, antenna virtualization can be non-transparent. Thus, the wireless communication apparatus that forms the virtual antenna(s) can indicate that antenna virtualization is employed, specify precoding that is utilized, etc. to the receiving wireless communication apparatus. Additionally or alternatively, the receiving wireless communication apparatus can control virtualization details (e.g., via signaling, . . . ), and hence, can be aware of the virtualization details implemented by the wireless communication apparatus that forms the virtual antenna(s).

Figure 2:
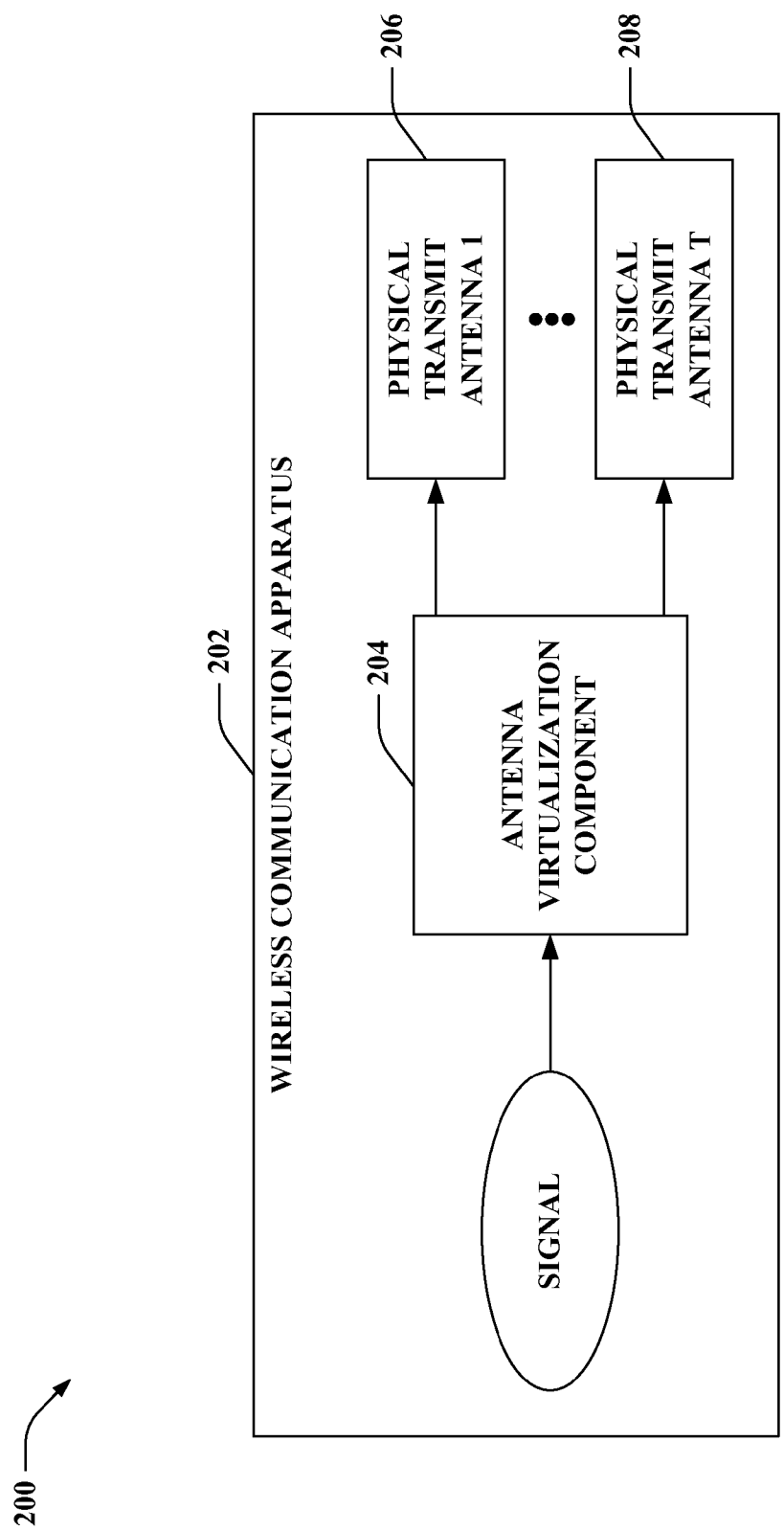
FIG. 2 is an illustration of an example system that employs antenna virtualization in a wireless communication environment.

Now turning to FIG. 2, illustrated is a system 200 that employs antenna virtualization in a wireless communication environment. System 200 includes a wireless communication apparatus 202 that transmits information, signals, data, instructions, commands, bits, symbols, and the like over a channel (e.g., uplink, downlink, . . . ) to a receiving wireless communication apparatus (not shown). Wireless communication apparatus 202, for instance, can be a base station (e.g., base station 102 of FIG. 1, . . . ), a UE (e.g., UE 116 of FIG. 1, UE 122 of FIG. 1, . . . ), or the like. Moreover, the receiving wireless communication apparatus can be, for example, a UE (e.g., UE 116 of FIG. 1, UE 122 of FIG. 1, . . . ), a base station (e.g., base station 102 of FIG. 1, . . . ), etc.

Wireless communication apparatus 202 can further include an antenna virtualization component 204 and a plurality of physical transmit antennas. Wireless communication apparatus 202 can include T physical transmit antennas (e.g., a physical transmit antenna 1 206, . . . , and a physical transmit antenna T 208), where T can be substantially any integer greater than 1. The T physical transmit antennas, including physical transmit antenna 1 206, . . . , and physical transmit antenna T 208, is hereinafter referred to as physical transmit antennas 206-208. Further, antenna virtualization component 204 can support a number of virtual antennas. For instance, the number of virtual antennas provided by antenna virtualization component 204 can be less than or equal to the number of physical transmit antennas 206-208 (e.g., the number of virtual antennas is an integer less than or equal to T, . . . ).

Antenna virtualization component 204 can implement precoding to efficiently utilize physical transmit antennas 206-208, as well as PAs respectively associated with physical transmit antennas 206-208. For example, antenna virtualization component 204 can employ a corresponding precoding vector for a virtual antenna supported thereby. Thus, if two virtual antennas are formed, then antenna virtualization component 204 can utilize two precoding vectors, where each of the virtual antennas is associated with a respective one of the precoding vectors; however, it is to be appreciated that the claimed subject matter is not so limited. A precoding vector can be used to formulate a virtual antenna from a plurality of physical transmit antennas 206-208 (e.g., the set of physical transmit antennas 206-208, a subset from the set of physical transmit antennas 206-208, . . . ).

By way of example, wireless communication apparatus 202 can include two physical transmit antennas (e.g., physical transmit antenna 1 206 and physical transmit antenna T 208, . . . ). Moreover, antenna virtualization component 204 can support one virtual antenna formed from the two physical transmit antennas, and thus, can employ one precoding vector. For instance, the precoding vector for the virtual antenna can be a 2-by-1 vector such as $[\alpha\ \beta]$. Following this example, a signal, X, to be sent upon the virtual antenna can be received by antenna virtualization component 204. Antenna virtualization component 204 can apply the precoding vector to the signal, X. Thus, antenna virtualization component 204 can multiply the signal, X, times $\alpha$ to yield a first output signal to be sent upon a first physical transmit antenna (e.g., physical transmit antenna 1 206, . . . ). Moreover, antenna virtualization component 204 can multiply the signal, X, times $\beta$ to yield a second output signal to be sent upon a second physical transmit antenna (e.g., physical transmit antenna T 208, . . . ). At a receiver side, a receiving wireless communication apparatus (not shown) can effectively see one transmit antenna after channel combining (e.g., if the receiving wireless communication apparatus has one receive antenna, . . . ). It is contemplated, however, that the claimed subject matter is not limited to the foregoing example.

Figure 3:
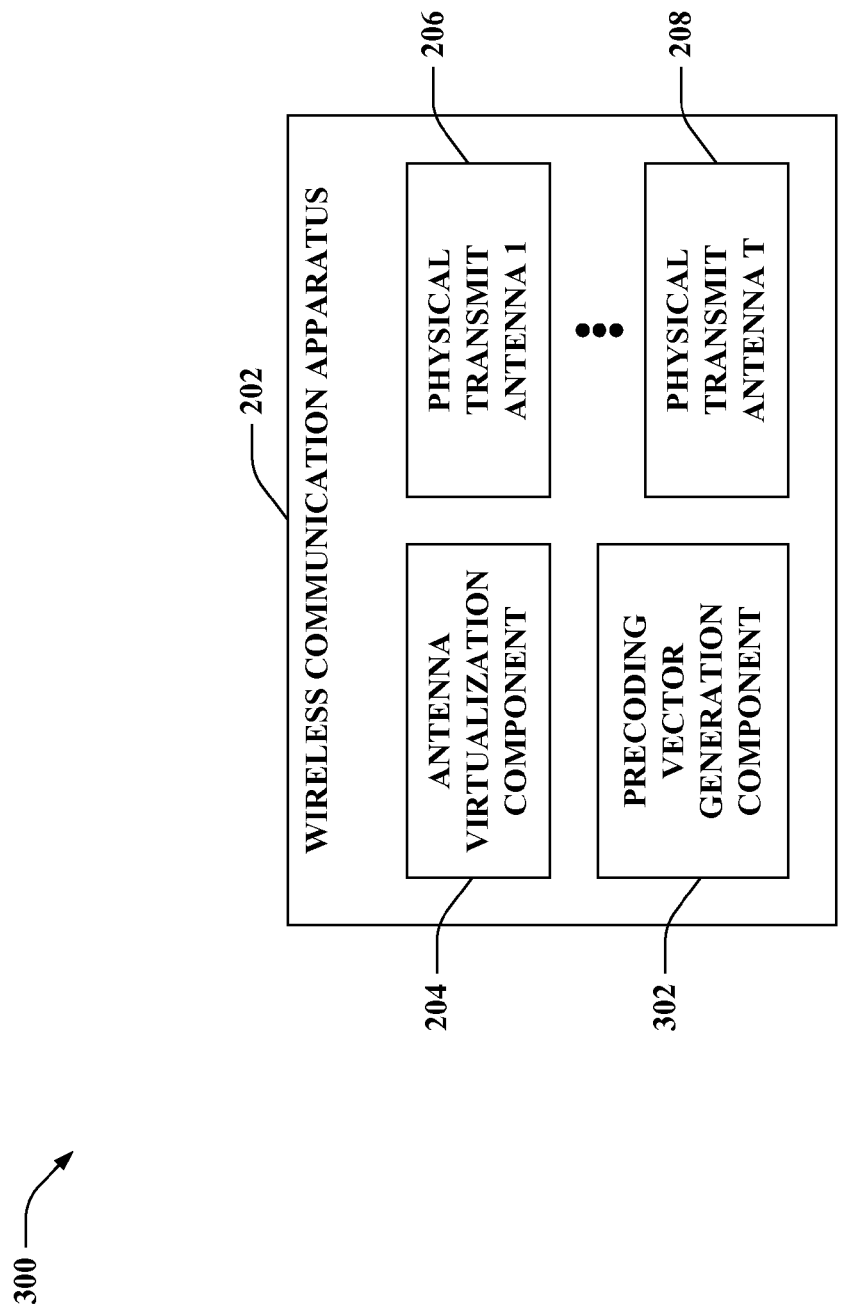
FIG. 3 is an illustration of an example system that formulates a precoding vector corresponding to a virtual antenna in a wireless communication environment.

With reference to FIG. 3, illustrated is a system 300 that formulates a precoding vector corresponding to a virtual antenna in a wireless communication environment. System 300 includes wireless communication apparatus 202, which can send signal(s) over a channel (e.g., uplink, downlink, . . . ). Wireless communication apparatus 202 can include antenna virtualization component 204 and a plurality of physical transmit antennas (e.g., physical transmit antenna 1 206, . . . , and physical transmit antenna T 208).

Wireless communication apparatus 202 can further include a precoding vector generation component 302 that can formulate a precoding vector for a virtual antenna. For example, precoding vector generation component 302 can select a number of virtual antennas to be formed from the T physical transmit antennas 206-208. Moreover, precoding vector generation component 302 can generate a respective precoding vector for each virtual antenna to be formed.

According to an illustration where wireless communication apparatus 202 is a UE, virtualization details including the number of virtual antennas to be formed and the precoding vector for each virtual antenna can be initiated by the UE itself by precoding vector generation component 302. Additionally or alternatively, such virtualization details can be semi-statically signaled by a base station and received by the UE (e.g., wireless communication apparatus 202, . . . ). Thus, precoding vector generation component 302 (and/or antenna virtualization component 204, . . . ) can collect received information specifying the number of virtual antennas to be formed and/or the precoding vector for each virtual antenna.

Pursuant to another illustration, wireless communication apparatus 202 can be a base station. Accordingly, the base station can employ precoding vector generation component 302 to yield the virtualization details including the number of virtual antennas to be formed and the precoding vector for each virtual antenna.

Although not shown, precoding vector(s) yielded, collected, etc. by precoding vector generation component 302 can be retained in memory of wireless communication apparatus 202. Further, the precoding vector(s) can be retrieved by antenna virtualization component 204 when implementing precoding as described herein. Memory can store data to be transmitted, received data, and any other suitable information related to performing the various actions and functions set forth herein. It will be appreciated that the data store (e.g., memory, . . . ) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the subject systems and methods is intended to comprise, without being limited to, these and any other suitable types of memory.

Figure 4:
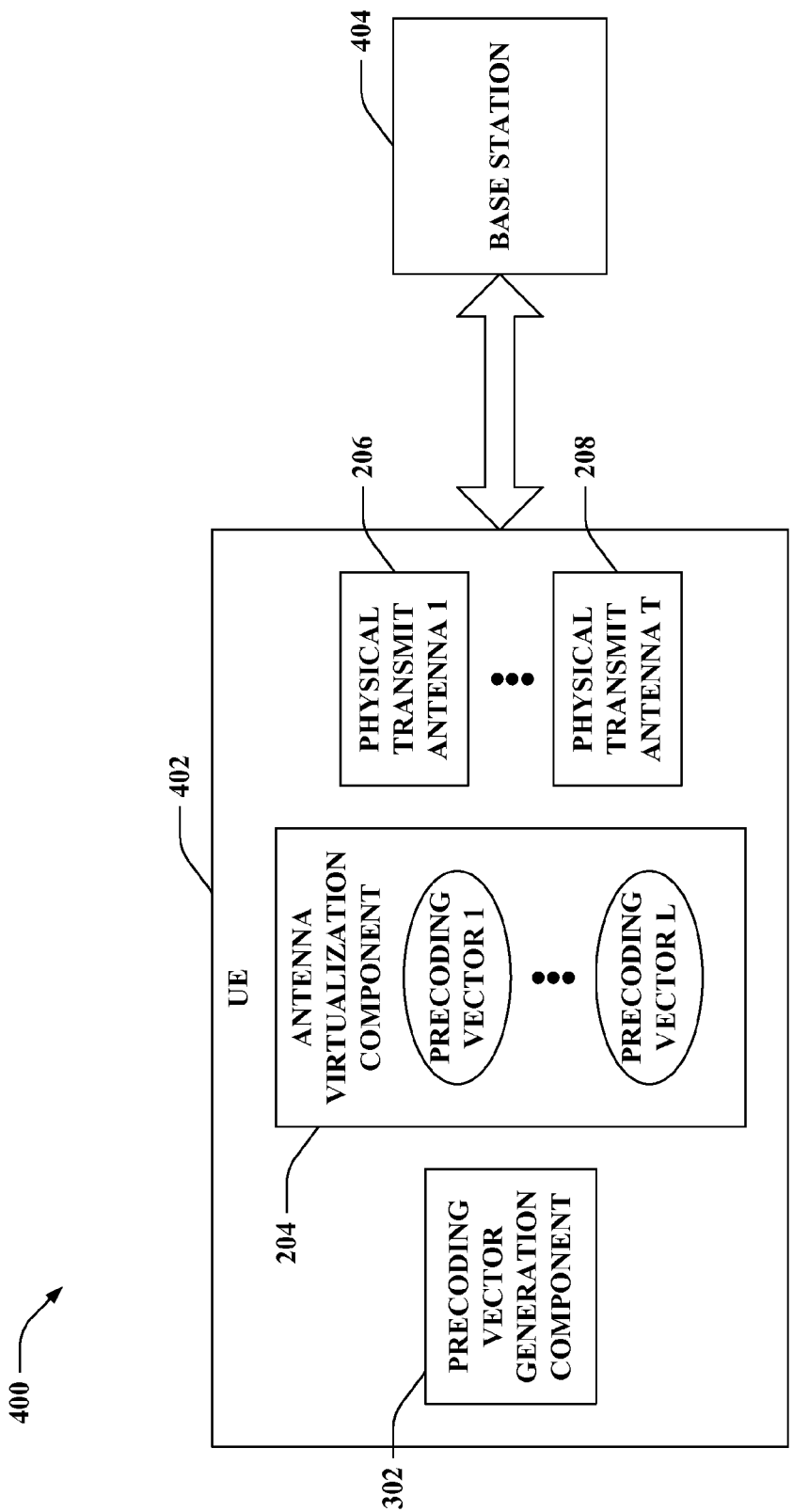
FIG. 4 is an illustration of an example system that performs antenna virtualization at a UE in a wireless communication environment.

Now turning to FIG. 4, illustrated is a system 400 that performs antenna virtualization at a UE in a wireless communication environment. System 400 includes a UE 402 (e.g., wireless communication apparatus 202 of FIG. 2, . . . ) and a base station 404 (e.g., a receiving wireless communication apparatus, . . . ). UE 402 can transmit and/or receive information, signals, data, instructions, commands, bits, symbols, and the like. UE 402 can communicate with base station 404 via the forward link and/or reverse link. Base station 404 can transmit and/or receive information, signals, data, instructions, commands, bits, symbols, and the like. Moreover, although not shown, it is contemplated that any number of UEs similar to UE 402 can be included in system 400 and/or any number of base stations similar to base station 404 can be included in system 400.

UE 402 includes multiple physical transmit antennas (e.g., physical transmit antenna 1 206, . . . , and physical transmit antennas T 208). Further, UE 402 can include precoding vector generation component 302 and antenna virtualization component 204. According to an example, virtual antenna(s) can be created by precoding vector generation component 302 by yielding precoding vector(s). For instance, L precoding vectors can be established by precoding vector generation component 302 (e.g., precoding vector 1, . . . , and precoding vector L), where L can be substantially any integer less than or equal to T (e.g., where T is the number of physical transmit antennas 206-208, . . . ). Although not shown, it is contemplated that one precoding vector can be created by precoding vector generation component 302. The precoding vector(s) provided by precoding vector generation component 302 can enable utilizing PAs efficiently while transmitting over the virtual antenna(s).

According to an example, virtualization details including the number of virtual antennas to be formed and the precoding vector for each virtual antenna can be initiated by UE 402 itself via employing precoding vector generation component 302. Additionally or alternatively, such virtualization details can be semi-statically signaled by base station 404 to UE 402. Hence, precoding vector generation component 302 (and/or antenna virtualization component 204, . . . ) can collect received information specifying the number of virtual antennas to be formed and/or the precoding vector for each virtual antenna.

By way of a further example, details on the precoding to form virtual antenna(s) can be transparent to base station 404. Thus, UE 402 can employ virtual antenna(s) by implementing precoding without indicating to base station 404 that such virtualization is being effectuated. However, it is also contemplated that antenna virtualization performed by UE 402 can be non-transparent to base station 404, and thus, base station 404 can have knowledge of the antenna virtualization performed by UE 402.

UE 402 can transmit information, signals, data, instructions, commands, bits, symbols, and the like over the uplink to base station 404. The uplink waveform can be a Discrete Fourier Transform (DFT)-precoded OFDM waveform (e.g., a single carrier FDM (SC-FDM) waveform, . . . ). A single carrier waveform can have a lower peak-to-average power ratio compared to a multi-carrier waveform, which can result in higher efficiency of a PA. Thus, precoding vector generation component 302 can try to reduce a chance of generating a multi-carrier waveform at physical transmit antennas 206-208 as much as possible while forming the virtual antenna(s). Accordingly, precoding vector generation component 302 can adopt various rules as described herein for yielding antenna-selection based precoding vector(s).

Precoding vector generation component 302 can form group(s) from physical transmit antennas 206-208 as follows, where a group corresponds to a particular virtual antenna.

Assume that precoding vector generation component 302 is to form L virtual antennas from T physical transmit antennas 206-208. Thus, precoding vector generation component 302 can partition the T physical transmit antennas 206-208 into L groups. Group i determines physical transmit antenna(s) from the T physical transmit antennas 206-208 (e.g., a subset of the T physical transmit antennas 206-208, . . . ) that are used to form a virtual antenna i, where i is an index and i=0, 1, . . . , L−1.

Moreover, precoding vector generation component 302 can formulate precoding vector(s) for the group(s). Precoding vector generation component 302 can yield a precoding vector in accordance with a particular group, where the precoding vector is a unit norm T-by-1 vector with non-zero entries corresponding to physical transmit antennas in the particular group that participate in forming a particular virtual antenna.

According to an example, assume that two virtual antennas (e.g., L=2, . . . ) are to be formed from four physical transmit antennas 206-208 (e.g., T=4, . . . ). The two virtual antennas can include virtual antenna 1 and virtual antenna 2, and the four physical transmit antennas can include physical transmit antenna 1, physical transmit antenna 2, physical transmit antenna 3, and physical transmit antennas 4. Following this example, an example grouping that can be formed by precoding vector generation component 302 can be {{3, 4} {1, 2}}, where a first group corresponding to virtual antenna 1 includes physical transmit antenna 3 and physical transmit antenna 4, and a second grouping corresponding to virtual antenna 2 includes physical transmit antenna 1 and physical transmit antenna 2. Further, precoding vector generation component 302 can formulate a first precoding vector (e.g., precoding vector 1, . . . ) for virtual antenna 1 such as: [0 0 $e^{jD1}$ $e^{jD2}$]/sqrt(2), and a second precoding vector (e.g., precoding vector 2, . . . ) for virtual antenna 2 such as: [$e^{jD3}$ $e^{jD4}$ 0 0]/sqrt(2), where phase values can be different for different frequency tones (e.g., resources, . . . ) and/or can change in time. It is to be appreciated, however, that the claimed subject matter is not limited to the foregoing example.

By way of another example, two virtual antennas (e.g., L=2, . . . ) can be formed from four physical transmit antennas 206-208 (e.g., T=4, . . . ). Again, the two virtual antennas can include virtual antenna 1 and virtual antenna 2, and the four physical transmit antennas can include physical transmit antenna 1, physical transmit antenna 2, physical transmit antenna 3, and physical transmit antennas 4. For instance, precoding vector generation component 302 can yield two precoding vectors, each with a size of T-by-1 (e.g., 4-by-1, . . . ). A precoding vector 1 for virtual antenna 1 formulated by precoding vector generation component 302 can be [α β γ δ], and a precoding vector 2 for virtual antennas 2 formulated by precoding vector generation component 302 can be [a b c d]. Moreover, a first signal, X, can be sent over virtual antenna 1, which uses precoding vector 1, [α β γ δ], while a second signal, Y, can be simultaneously sent over virtual antenna 1, which uses precoding vector 2, [a b c d]. Thus, antenna virtualization component 204 can implement precoding upon the first signal, X, and the second signal, Y, utilizing precoding vector 1 and precoding vector 2. Accordingly, X times α plus Y times a can be sent over physical transmit antenna 1, X times β plus Y times b can be sent over physical transmit antenna 2, X times γ plus Y times c can be sent over physical transmit antenna 3, and X times δ plus Y times d can be sent over physical transmit antenna 4. To maintain the single carrier nature of the DFT-precoded OFDM waveform transmitted over the uplink by UE 402 to base station 404, a or α is zero, β or b is zero, γ or c is zero, and δ or d is zero. Accordingly, each physical transmit antenna 206-208 can be used for one virtual antenna (e.g., virtual antenna 1 or virtual antenna 2 in the aforementioned example, . . . ) so that transmission of multiple signals over one physical transmit antenna can be avoided; hence, each physical transmit antenna 206-208 can transmit a single carrier waveform regardless whether different signals are simultaneously transmitted over different virtual antennas. It is to be appreciated, however, that the claimed subject matter is not limited to the foregoing example.

Precoding vector generation component 302 can cause a virtual antenna that is formed to occupy a subset of physical transmit antennas 206-208. Over all physical transmit antenna(s), non-zero value(s) can be included at corresponding position(s) corresponding to the subset of physical transmit antenna(s) within a precoding vector formed for the virtual antenna. Moreover, for physical transmit antenna(s) that are not included in the subset, zero value(s) can be included at corresponding position(s) within the precoding vector formed for the virtual antenna.

Moreover, after virtual antennas have been formed, the virtual antennas can be considered to be physical transmit antennas from a point of view of data, a reference signal, and control. For instance, if UE 402 has four physical transmit antennas 206-208, precoding vector generation component 302 can virtualize the four physical transmit antennas 206-208 into two virtual antennas. After effectuating the virtualization, UE 402 can be treated as having two transmit antennas (e.g., two virtual antennas, . . . ) even though it actually has four physical transmit antennas 206-208. Further, base station 404 can view UE 402 as having two transmit antennas (e.g., two virtual antennas, . . . ), and different reference signals, control, data, etc. can be received from the two transmit antennas of UE 402.

Figure 5:
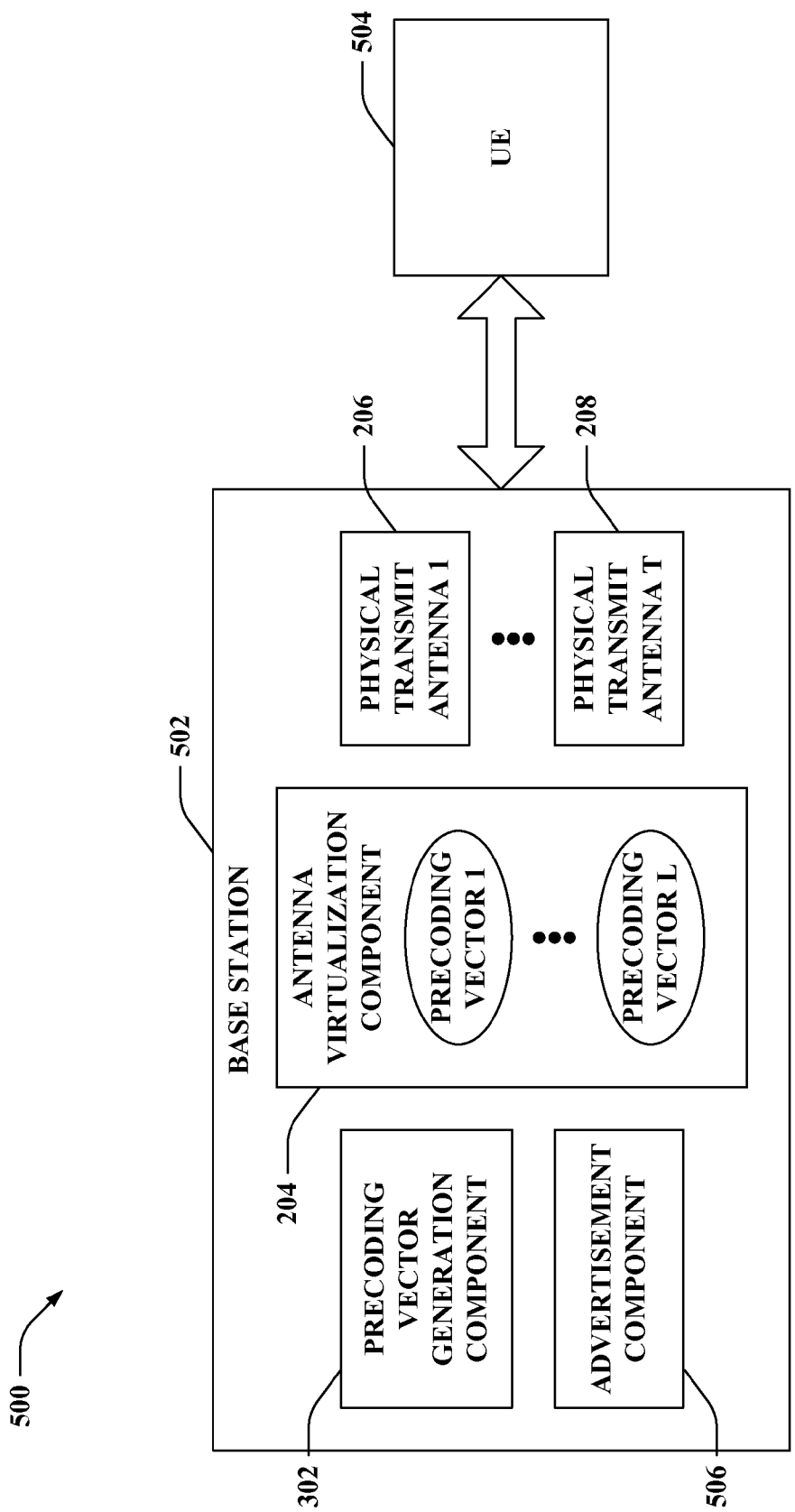
FIG. 5 is an illustration of example system that performs antenna virtualization at a base station in a wireless communication environment.

Referring to FIG. 5, illustrated is a system 500 that performs antenna virtualization at a base station in a wireless communication environment. System 500 includes a base station 502 (e.g., wireless communication apparatus 202 of FIG. 2, base station 404 of FIG. 4, . . . ) and a UE 504 (e.g., a receiving wireless communication apparatus, UE 402 of FIG. 4, . . . ). Base station 502 can transmit and/or receive information, signals, data, instructions, commands, bits, symbols, and the like. Base station 502 can communicate with UE 504 via the forward link and/or reverse link. UE 504 can transmit and/or receive information, signals, data, instructions, commands, bits, symbols, and the like. Moreover, although not shown, it is contemplated that any number of base stations similar to base station 502 can be included in system 500 and/or any number of UEs similar to UE 504 can be included in system 500.

Base station 502 includes multiple physical transmit antennas (e.g., physical transmit antenna 1 206, . . . , and physical transmit antennas T 208). Further, base station 502 can include precoding vector generation component 302 and antenna virtualization component 204. According to an example, virtual antenna(s) can be created by precoding vector generation component 302 by yielding precoding vector (s). For instance, L precoding vectors can be established by precoding vector generation component 302 (e.g., precoding vector 1, . . . , and precoding vector L), where L can be substantially any integer less than or equal to T (e.g., where T is the number of physical transmit antennas 206-208, . . . ). Although not shown, it is contemplated that one precoding vector can be created by precoding vector generation component 302. The precoding vector(s) provided by precoding vector generation component 302 can enable utilizing PAs efficiently while transmitting over the virtual antenna(s), allowing base station 502 to benefit from full power utilization of the PAs.

Moreover, base station 502 can include an advertisement component 506 that can indicate a number of antennas to UE 504. For instance, the indicated number of antennas can be a number of virtual antennas formed by precoding vector generation component 302 and/or utilized by antenna virtualization component 204. A number of physical transmit antennas 206-208 included in base station 502 can be larger than a number of antennas advertised by advertisement component 506 to UE 504 (e.g., a legacy UE, a LTE-A UE, . . . ). For instance, in LTE Release 8, a maximum number of downlink physical transmit antennas can be four, while in LTE-A, a maximum number of downlink physical transmit antennas can be eight. Thus, if UE 504 is a legacy UE (e.g., LTE Release 8 UE, . . . ) operating in an LTE-A network where base station 502 includes eight physical transmit antennas 206-208 (e.g., T=8, . . . ), then advertisement component 506 can signal to UE 504 that base station 502 includes four transmit antennas (or fewer than four transmit antennas). Hence, antenna virtualization can support legacy UEs by providing for legacy compatible design. It is to be appreciated, however, that the claimed subject matter is not limited to the aforementioned illustration.

Further, legacy UE(s) and non-legacy UE(s) (e.g., LTE-A UE(s), . . . ) can coexist and operate in a common network. Antenna virtualization can be employed for legacy UE(s) (e.g., forming four or fewer virtual antennas from eight physical transmit antennas 206-208 of base station 502 for legacy UE(s), . . . ). According to an example, antenna virtualization can be employed for non-legacy UE(s) (e.g., forming four or fewer virtual antennas from eight physical transmit antennas 206-208 of base station 502 for non-legacy UE(s), . . . ). By way of another example, antenna virtualization need not be employed for non-legacy UE(s), while antenna virtualization is utilized for legacy UE(s). Thus, advertisement component 506 can indicate the number of physical transmit antennas 206-208 of base station 502 or the number of virtual antennas formulated by precoding vector generation component 302 and implemented by antenna virtualization component 204 to a non-legacy UE (e.g., UE 504, . . . ). Following the above illustration where advertisement component 506 signals to a legacy UE that base station 502 includes four (or fewer) transmit antennas (e.g., four or fewer virtual antennas, . . . ) rather than eight physical transmit antennas 206-208, advertisement component 506 can further signal to a non-legacy UE that base station 502 includes four (or fewer) transmit antennas (e.g., four or fewer virtual antennas, . . . ) or eight transmit antennas (e.g., eight physical transmit antennas 206-208, . . . ).

Further, for a downlink scenario, virtualization can be transparent to UE 504. Thus, UE 504 can lack knowledge of virtualization details employed by base station 502 such as, for instance, that virtualization is effectuated, precoding vector(s) employed, how precoding vector(s) are generated, and the like.

A waveform employed for the downlink can be an OFDM waveform. Thus, constraints utilized in connection with uplink antenna virtualization (as described in connection with FIG. 4) need not be employed in system 500. For instance, multiple signals can be transmitted simultaneously over a particular physical transmit antenna (e.g., from physical transmit antennas 206-208, . . . ), and hence, the waveform need not be a single carrier waveform. However, it is to be appreciated that the claimed subject matter is not so limited.

Precoding vector generation component 302 can virtualize physical transmit antennas 206-208 as follows. For instance, a mapping from physical transmit antennas 206-208 to virtual antenna(s) can be any unit norm precoding vector. The precoding vector(s) can be designed such that a dimensionality of a virtual channel is not reduced beyond a number of desired virtual antenna(s). For example, precoding vector generation component 302 can partition physical transmit antennas 206-208 into groups, where each group corresponds to one virtual antenna. Precoding vector generation component 302 can yield a precoding vector for each group. For instance, a precoding vector for a particular group can be a unit norm vector with non-zero entries corresponding to physical transmit antennas in the particular group that participate in that virtual antenna. By way of another illustration, precoding vector generation component 302 can utilize fixed precoding vectors (e.g., different columns of a DFT matrix as precoding vectors for virtual antennas, . . . ).

Moreover, after virtual antennas have been formed, the virtual antennas can be considered to be physical transmit antennas from a point of view of data, a reference signal, and control. For instance, if base station 502 has four physical transmit antennas 206-208, precoding vector generation component 302 can virtualize the four physical transmit antennas 206-208 into two virtual antennas. After effectuating the virtualization, base station 502 can be treated as having two transmit antennas (e.g., two virtual antennas, . . . ) even though it actually has four physical transmit antennas 206-208. Further, UE 504 can view base station 502 as having two transmit antennas (e.g., two virtual antennas, . . . ), and different reference signals, control, data, etc. can be received from the two transmit antennas of base station 502.

Figure 6:
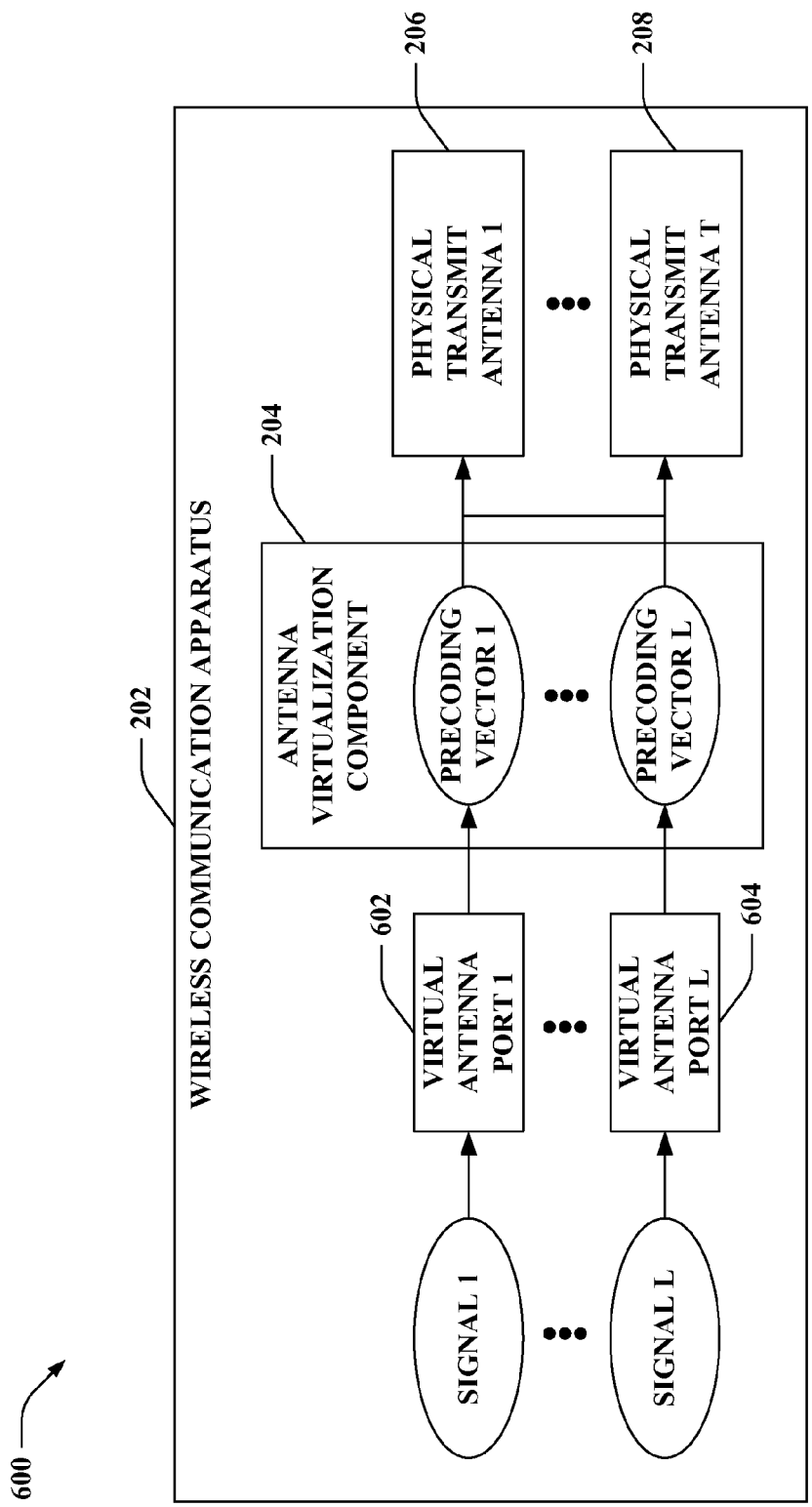
FIG. 6 is an illustration of an example system that employs virtual antenna ports for sending signals in a wireless communication environment.

Now referring to FIG. 6, illustrated is a system 600 that employs virtual antenna ports for sending signals in a wireless communication environment. System 600 includes wireless communication apparatus 202 (e.g., UE 402 of FIG. 4, base station 502 of FIG. 5, . . . ). Wireless communication apparatus 202 can further include antenna virtualization component 204 and multiple physical transmit antennas (e.g., physical transmit antenna 1 206, . . . , and physical transmit antenna T 208). Moreover, L virtual antennas can be formed from the multiple physical transmit antennas 206-208 (e.g., by precoding vector generation component 302 of FIG. 3, . . . ). Thus, wireless communication apparatus 202 can include L virtual antenna ports (e.g., virtual antenna port 1 602, . . . , and virtual antenna port L 604), which can be used to send respective signals.

According to an illustration, wireless communication apparatus 202 can include four physical transmit antennas 206-208 (e.g., T=4, . . . ). Moreover, two virtual antennas (e.g., L=2, . . . ) can be formed from the four physical transmit antennas 206-208. Thus, wireless communication apparatus 202 can include two virtual antenna ports 602-604. Further, a first signal to be sent over a first virtual antenna can be provided to a first virtual antenna port (e.g., virtual antenna port 1 602, . . . ) and a second signal to be sent over a second virtual antenna can be provided to a second virtual antenna port (e.g., virtual antenna port L 604, . . . ). Antenna virtualization component 204 can apply a first precoding vector (e.g., precoding vector 1, . . . ) to the first signal obtained by the first virtual antenna port and can apply a second precoding vector (e.g., precoding vector L, . . . ) to the second signal obtained by the second virtual antenna port. Accordingly, two signals can be sent over the four physical transmit antennas 206-208 following the aforementioned illustration (e.g., which can lead to reduced overhead since fewer reference signals need to be generated by wireless communication apparatus 202 for transmission, . . . ).

Moreover, precoding vectors described herein need not be constant over frequency. Virtualization can be a frequency dependent mapping to provide additional frequency diversity for frequency flat scenarios. Schemes like cyclic delay diversity (CDD) or frequency-dependent phase offset within each group are examples of frequency dependent mapping. Moreover, if wireless communication apparatus 202 is a base station (e.g., base station 502 of FIG. 5, . . . ), then in order to provide a legacy UE (not shown) (e.g., UE 504 of FIG. 5, . . . ) with reasonable channel estimation of the virtual antennas, the frequency dependent mapping can be smooth and may not change rapidly over frequency. Thus, to make a virtual antenna appear similar to a physical transmit antenna, a precoding vector can change smoothly over tones rather than arbitrarily changing over tones.

Figure 7:
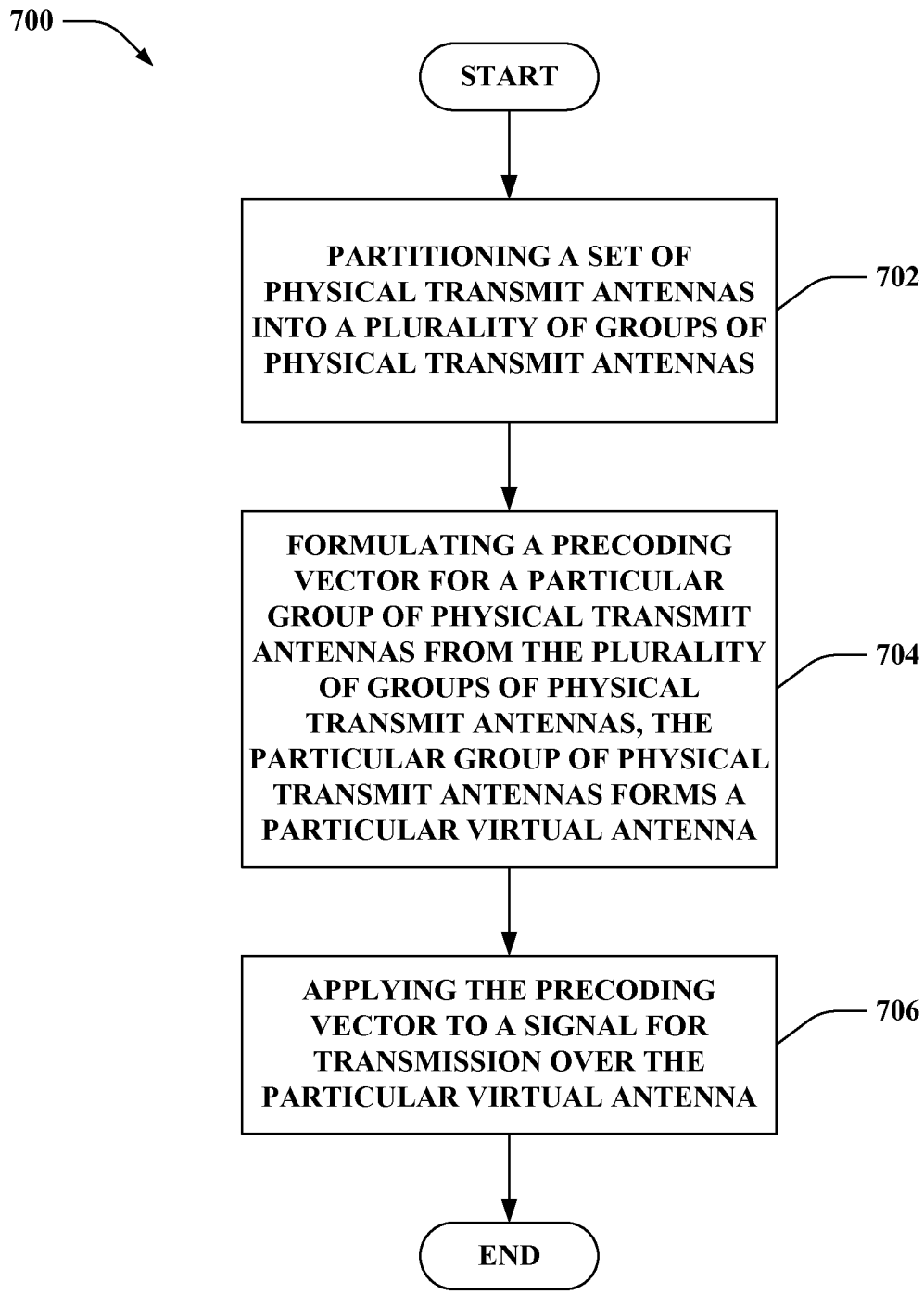
FIG. 7 is an illustration of an example methodology that facilitates implementing antenna virtualization in a wireless communication environment.
Figure 8:
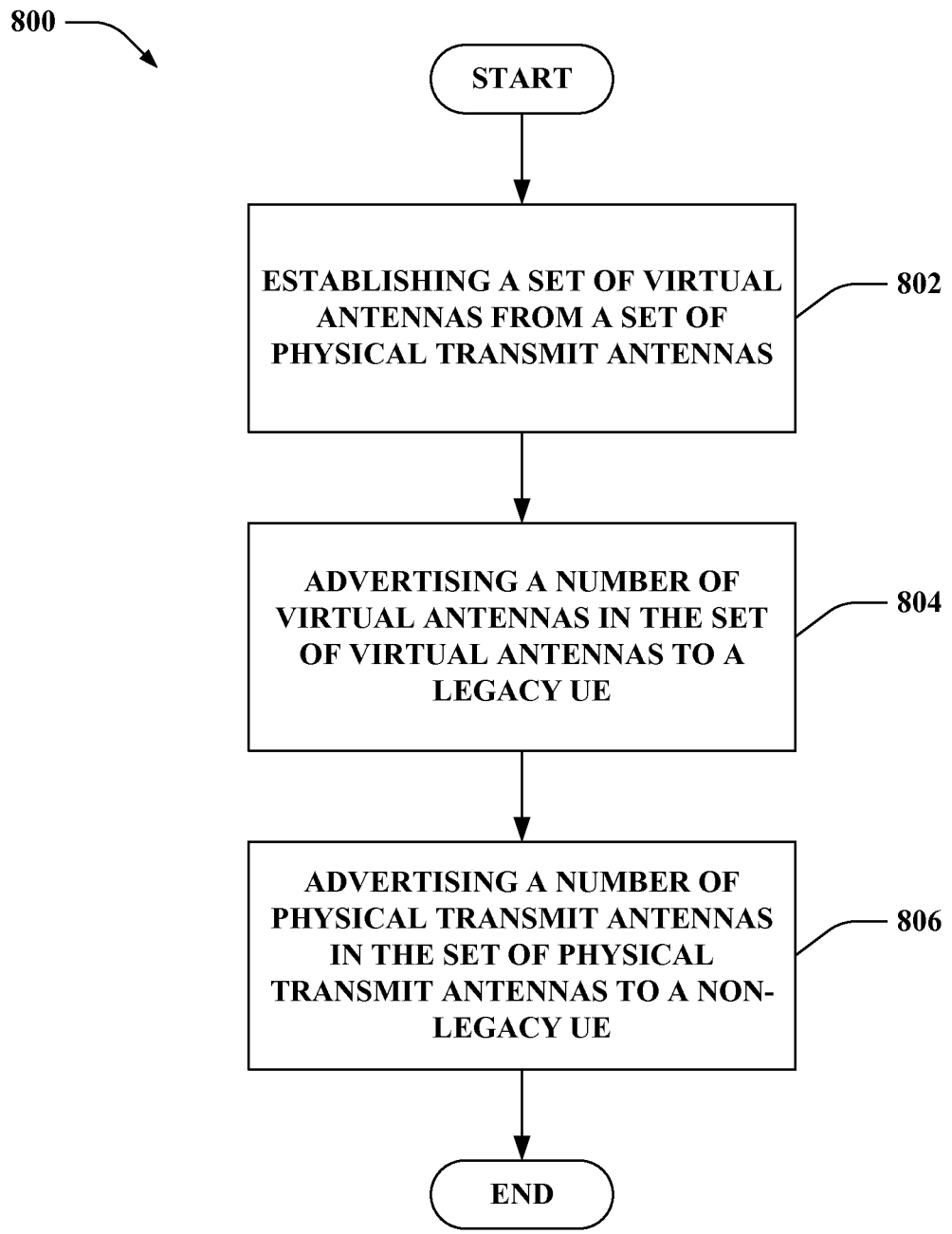
FIG. 8 is an illustration of an example methodology that facilitates allowing for legacy compatible design by leveraging antenna virtualization in a wireless communication environment.

Referring to FIGS. 7-8, methodologies relating to employing antenna virtualization in a wireless communication environment are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

With reference to FIG. 7, illustrated is a methodology 700 that facilitates implementing antenna virtualization in a wireless communication environment. At 702, a set of physical transmit antennas can be partitioned into a plurality of groups of physical transmit antennas. For example, the set of physical transmit antennas can include T physical transmit antennas, where T can be substantially any integer. Moreover, the set of T physical transmit antennas can be partitioned into L groups, where L can be substantially any integer less than or equal to T.

At 704, a precoding vector can be formulated for a particular group of physical transmit antennas from the plurality of groups of physical transmit antennas. The particular group of physical transmit antennas can form a particular virtual antenna. Further, if the set of T physical transmit antennas are partitioned into L groups, then L precoding vectors can be formulated. Moreover, the L precoding vectors can correspond to L virtual antennas. According to an example, a disparate precoding vector for a disparate group of physical transmit antennas from the plurality of groups of physical transmit antennas can be formulated, wherein the disparate group of physical transmit antennas can form a disparate virtual antenna. At 706, the precoding vector can be applied to a signal for transmission over the particular virtual antenna. Moreover, disparate precoding vector(s) corresponding to disparate virtual antenna(s) can be applied to disparate signal (s) for transmission over the disparate virtual antenna(s).

According to an example, the set of physical transmit antennas can be associated with a user equipment (UE), and the signal can be for transmission over an uplink to a base station. For instance, a number of virtual antennas to form can be selected (e.g., by the UE, . . . ), where the number of virtual antennas can be a number of the groups into which the set of physical transmit antennas is partitioned. Further, the precoding vector for the particular group (and/or disparate precoding vector(s) for disparate group(s)) can be chosen (e.g., by the UE, . . . ). By way of another illustration, an indication that specifies at least one of a number of virtual antennas to form (e.g., where the number of virtual antennas can be a number of the groups into which the set of physical transmit antennas is partitioned, . . . ) or the precoding vector for the particular group (and/or disparate precoding vector(s) for disparate group(s)) can be received from the base station. Moreover, information related to antenna virtualization can be transparent to the base station. Further, a waveform sent over the uplink can be a single carrier waveform (e.g., a Discrete Fourier Transform (DFT)-precoded orthogonal frequency division multiplexing (OFDM) waveform, . . . ). By way of another example, the precoding vector can be a unit norm vector of size T-by-1 with non-zero entries corresponding to physical transmit antennas in the particular group that forms the particular virtual antenna, where T is a number of physical transmit antennas in the set. Further, a remainder of entries in the T-by-1 unit norm vector (e.g., corresponding to physical transmit antennas not included in the particular group, corresponding to physical transmit antennas associated with a differing virtual antenna, . . . ) can be zero. Moreover, non-zero entries in the precoding vector can be constant. Further, non-zero entries in the precoding vector can be frequency dependent and/or time dependent.

By way of another example, the set of physical transmit antennas can be associated with a base station, and the signal can be for transmission over a downlink to a user equipment (UE). For instance, information related to antenna virtualization can be transparent to the UE. Pursuant to an example, the precoding vector can be a unit norm vector. In accordance with another example, the precoding vector can be a unit norm vector with non-zero entries corresponding to physical transmit antennas in the particular group that participate in the particular virtual antenna. Yet another example relates to the precoding vector being a particular column of a Discrete Fourier Transform (DFT) matrix, where different column(s) of the DFT matrix are utilized for disparate virtual antenna(s). Moreover, non-zero entries in the precoding vector can be constant. Further, non-zero entries in the precoding vector can be frequency dependent and/or time dependent.

Turning to FIG. 8, illustrated is a methodology 800 that facilitates allowing for legacy compatible design by leveraging antenna virtualization in a wireless communication environment. At 802, a set of virtual antennas can be established from a set of physical transmit antennas. For instance, the set of virtual antennas can be established by a base station. Moreover, the set of physical transmit antennas associated with the base station can include a larger number of physical transmit antennas as compared to a maximum number of physical transmit antennas that can be employed by a legacy base station. By way of example, the set of physical transmit antennas associated with the base station can include eight physical transmit antennas, while a maximum number of physical transmit antennas that can be employed by the legacy base station can be four physical transmit antennas; however, it is to be appreciated that the claimed subject matter is not so limited. At 804, a number of virtual antennas in the set of virtual antennas can be advertised to a legacy user equipment (UE). At 806, a number of physical transmit antennas in the set of physical transmit antennas can be advertised to a non-legacy UE (e.g., Long Term Evolution—Advanced (LTE-A) UE, . . . ). Thus, virtualization can be employed for the legacy UE (e.g., when advertising the number of virtual antennas in the set of virtual antennas, . . . ), while virtualization need not be employed for the non-legacy UE. However, it is further contemplated that the number of virtual antennas in the set of virtual antennas can be advertised to the non-legacy UE and/or virtualization can be employed for the non-legacy UE.

It will be appreciated that, in accordance with one or more aspects described herein, inferences can be made pertaining to implementing antenna virtualization in a wireless communication environment. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 9:
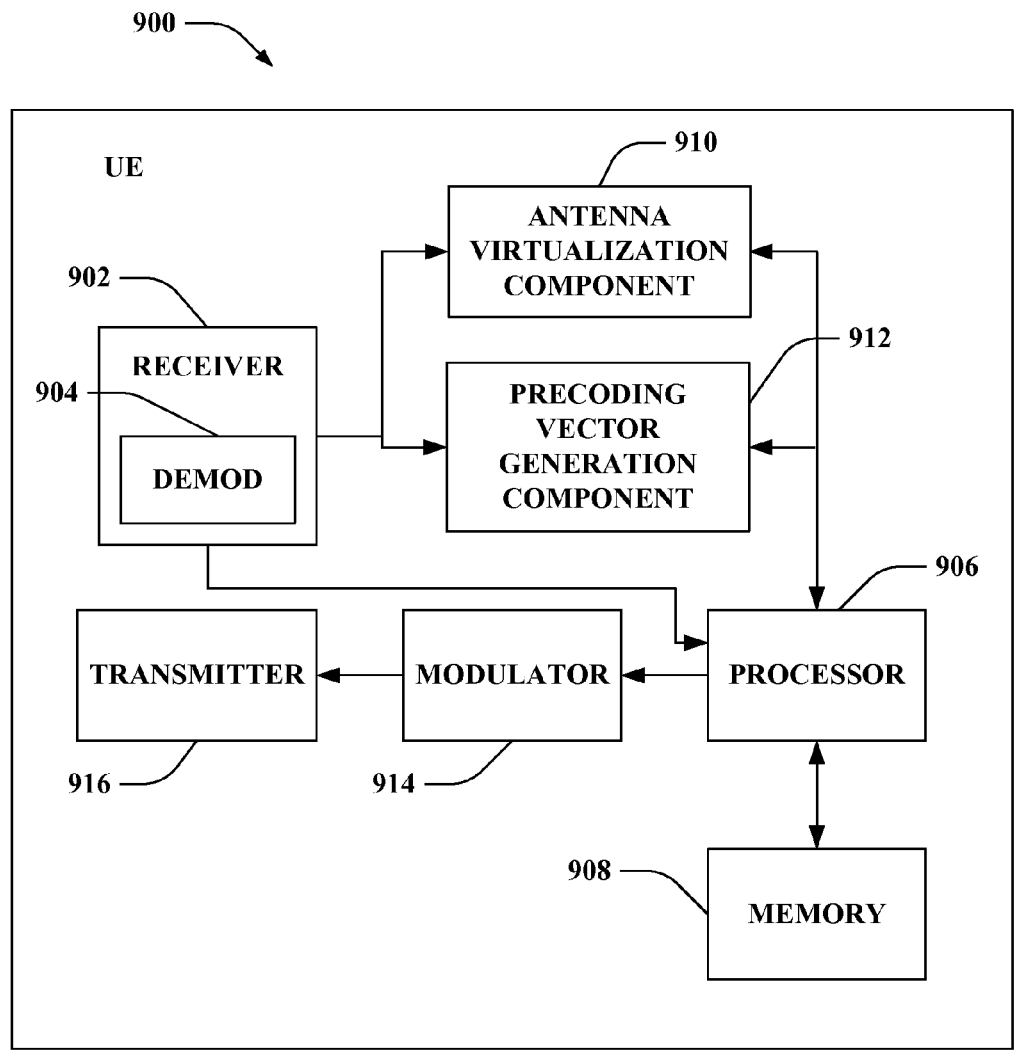
FIG. 9 is an illustration of an example UE that employs antenna virtualization in a wireless communication system.

FIG. 9 is an illustration of a UE 900 that employs antenna virtualization in a wireless communication system. UE 900 comprises a receiver 902 that receives a signal from, for instance, a receive antenna (not shown), and performs typical actions thereon (e.g., filters, amplifies, downconverts, etc.) the received signal and digitizes the conditioned signal to obtain samples. Receiver 902 can be, for example, an MMSE receiver, and can comprise a demodulator 904 that can demodulate received symbols and provide them to a processor 906 for channel estimation. Processor 906 can be a processor dedicated to analyzing information received by receiver 902 and/or generating information for transmission by a transmitter 916, a processor that controls one or more components of UE 900, and/or a processor that both analyzes information received by receiver 902, generates information for transmission by transmitter 916, and controls one or more components of UE 900.

UE 900 can additionally comprise memory 908 that is operatively coupled to processor 906 and that can store data to be transmitted, received data, and any other suitable information related to performing the various actions and functions set forth herein. Memory 908, for instance, can store protocols and/or algorithms associated with partitioning a plurality of physical transmit antennas into multiple groups, formulating respective precoding vectors for the multiple groups, and the like. Moreover, memory 908 can maintain precoding vectors.

It will be appreciated that the data store (e.g., memory 908) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 908 of the subject systems and methods is intended to comprise, without being limited to, these and any other suitable types of memory.

Processor 906 can be operatively coupled to an antenna virtualization component 910 and/or a precoding vector generation component 912. Antenna virtualization component 910 can be substantially similar to antenna virtualization component 204 of FIG. 2 and/or precoding vector generation component 912 can be substantially similar to precoding vector generation component 302 of FIG. 3. Precoding vector generation component 912 can yield precoding vector(s) associated with virtual antenna(s) formed from a plurality of physical transmit antennas (not shown) of UE 900. Moreover, antenna virtualization component 910 can implement precoding (e.g., using the precoding vector(s) yielded by precoding vector generation component 912, . . . ) to send signal(s) for transmission over the virtual antenna(s). UE 900 still further comprises a modulator 914 and a transmitter 916 that transmits data, signals, etc. to a base station. Although depicted as being separate from the processor 906, it is to be appreciated that antenna virtualization component 910, precoding vector generation component 912, and/or modulator 914 can be part of processor 906 or a number of processors (not shown).

Figure 10:
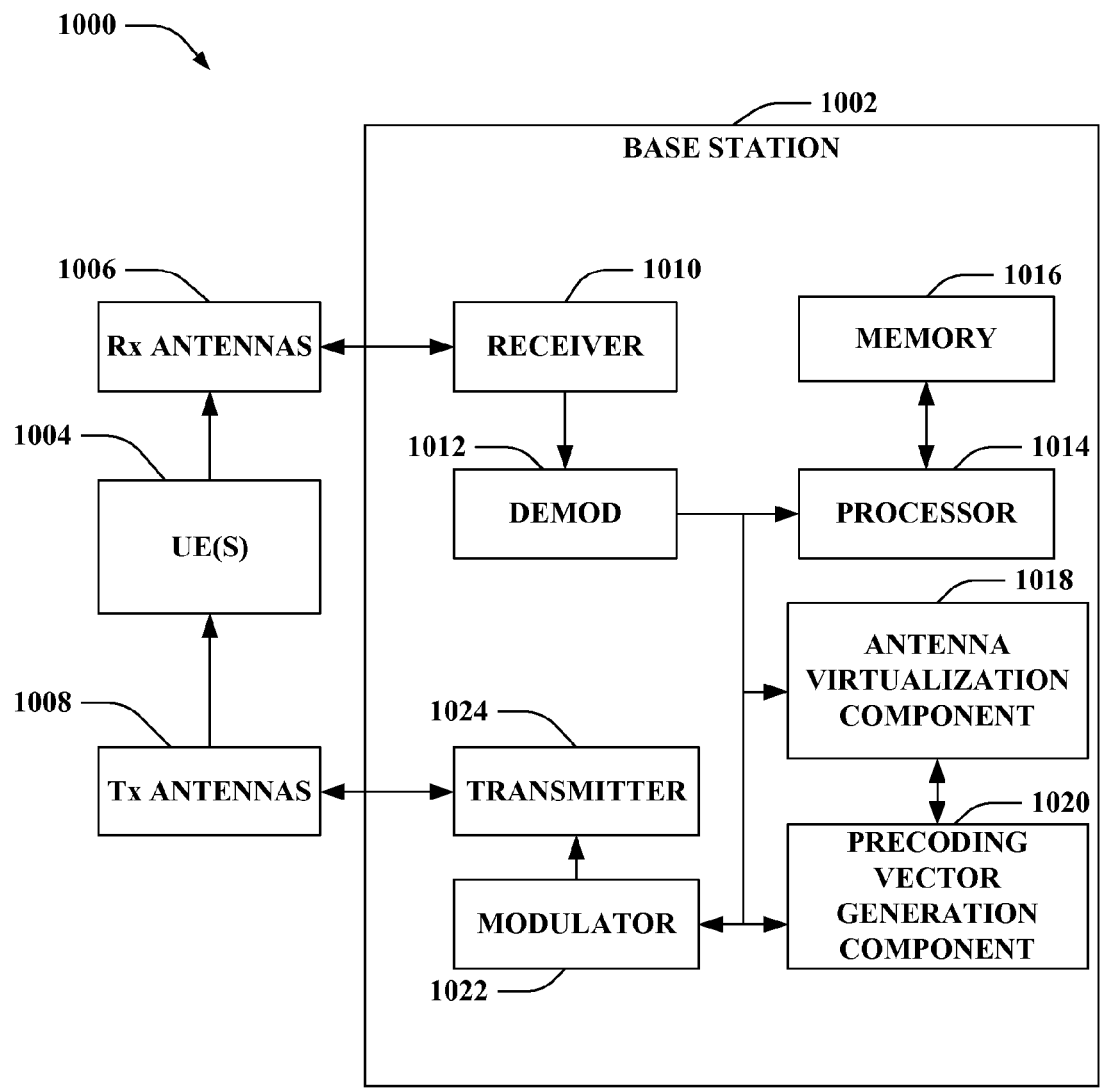
FIG. 10 is an illustration of an example system that establishes and utilizes virtual antennas in a wireless communication environment.

FIG. 10 is an illustration of a system 1000 that establishes and utilizes virtual antennas in a wireless communication environment. System 1000 comprises a base station 1002 (e.g., access point, . . . ) with a receiver 1010 that receives signal(s) from one or more UEs 1004 through a plurality of receive antennas 1006, and a transmitter 1024 that transmits to the one or more UEs 1004 through a plurality of transmit antennas 1008. Receiver 1010 can receive information from receive antennas 1006 and is operatively associated with a demodulator 1012 that demodulates received information. Demodulated symbols are analyzed by a processor 1014 that can be similar to the processor described above with regard to FIG. 9, and which is coupled to a memory 1016 that stores data to be transmitted to or received from UE(s) 1004 and/or any other suitable information related to performing the various actions and functions set forth herein. Processor 1014 is further coupled to an antenna virtualization component 1018 and/or a precoding vector generation component 1020. Antenna virtualization component 1018 can be substantially similar to antenna virtualization component 204 of FIG. 2 and/or precoding vector generation component 1020 can be substantially similar to precoding vector generation component 302 of FIG. 3. Precoding vector generation component 1020 can yield precoding vector(s) associated with virtual antenna(s) formed from the plurality of physical transmit antennas 1008 of base station 1002. Moreover, antenna virtualization component 1018 can implement precoding (e.g., using the precoding vector(s) yielded by precoding vector generation component 1020, . . . ) to send signal(s) for transmission over the virtual antenna(s). Although not shown, it is contemplated that base station 1002 can further include an advertisement component, which can be substantially similar to advertisement component 506 of FIG. 5. Base station 1002 can further include a modulator 1022. Modulator 1022 can multiplex a frame for transmission by a transmitter 1024 through antennas 1008 to UE(s) 1004 in accordance with the aforementioned description. Although depicted as being separate from the processor 1014, it is to be appreciated that antenna virtualization component 1018, precoding vector generation component 1020, and/or modulator 1022 can be part of processor 1014 or a number of processors (not shown).

Figure 11:
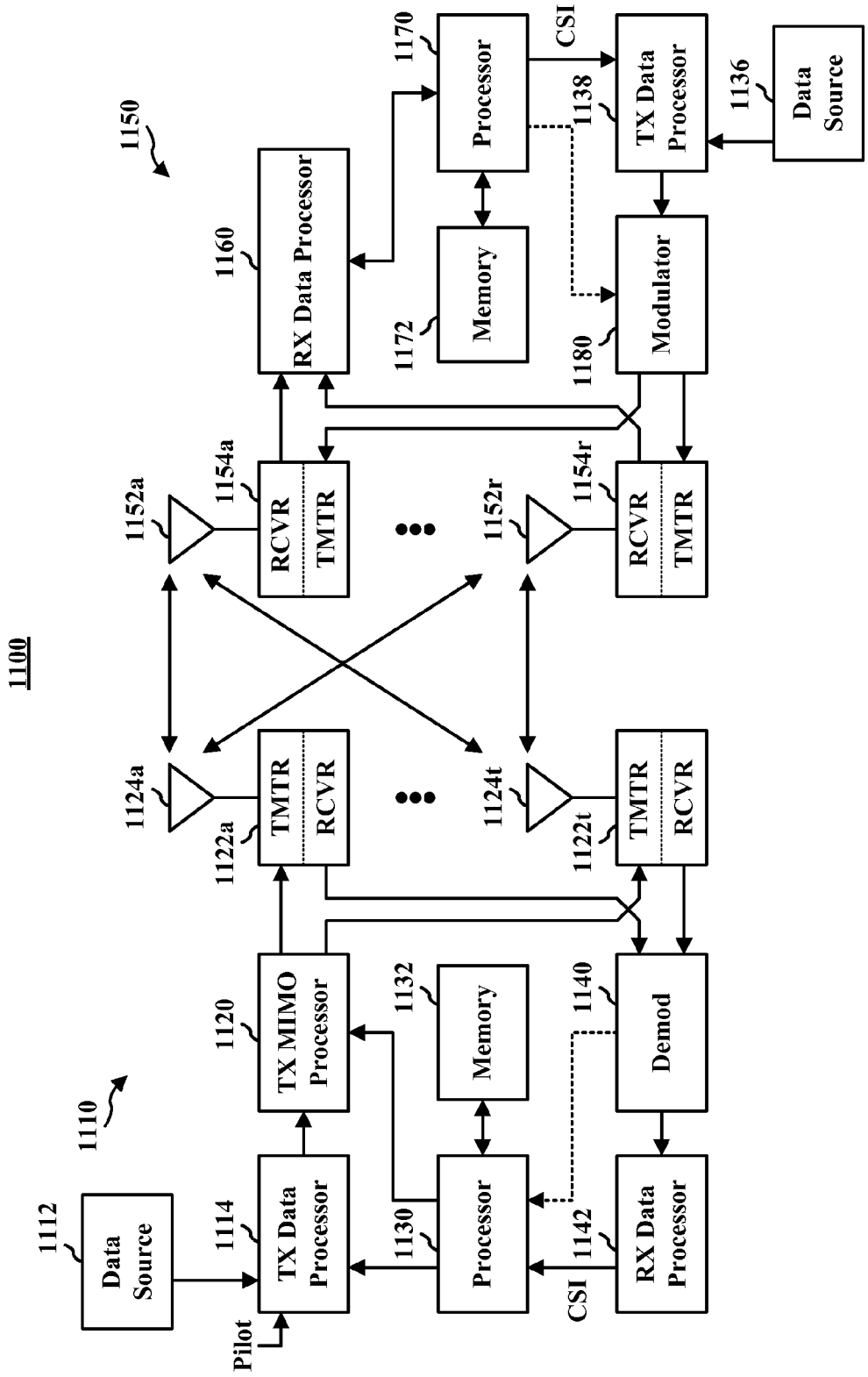
FIG. 11 is an illustration of an example wireless network environment that can be employed in conjunction with the various systems and methods described herein.

FIG. 11 shows an example wireless communication system 1100. The wireless communication system 1100 depicts one base station 1110 and one UE 1150 for sake of brevity. However, it is to be appreciated that system 1100 can include more than one base station and/or more than one UE, wherein additional base stations and/or UEs can be substantially similar or different from example base station 1110 and UE 1150 described below. In addition, it is to be appreciated that base station 1110 and/or UE 1150 can employ the systems (FIGS. 1-6, 9-10, and 12) and/or methods (FIGS. 7-8) described herein to facilitate wireless communication there between.

At base station 1110, traffic data for a number of data streams is provided from a data source 1112 to a transmit (TX) data processor 1114. According to an example, each data stream can be transmitted over a respective antenna. TX data processor 1114 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at UE 1150 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1130.

The modulation symbols for the data streams can be provided to a TX MIMO processor 1120, which can further process the modulation symbols (e.g., for OFDM). TX MIMO processor 1120 then provides $N_T$ modulation symbol streams to $N_T$ transmitters (TMTR) 1122a through 1122t. In various embodiments, TX MIMO processor 1120 applies beamforming weights to the symbols of the data streams and to the antenna from which the symbol is being transmitted.

Each transmitter 1122 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1122a through 1122t are transmitted from $N_T$ antennas 1124a through 1124t, respectively.

At UE 1150, the transmitted modulated signals are received by $N_R$ antennas 1152a through 1152r and the received signal from each antenna 1152 is provided to a respective receiver (RCVR) 1154a through 1154r. Each receiver 1154 conditions (e.g., filters, amplifies, and downconverts) a respective signal, digitizes the conditioned signal to provide samples, and further processes the samples to provide a corresponding "received" symbol stream.

An RX data processor 1160 can receive and process the $N_R$ received symbol streams from $N_R$ receivers 1154 based on a particular receiver processing technique to provide $N_T$ "detected" symbol streams. RX data processor 1160 can demodulate, deinterleave, and decode each detected symbol stream to recover the traffic data for the data stream. The processing by RX data processor 1160 is complementary to that performed by TX MIMO processor 1120 and TX data processor 1114 at base station 1110.

A processor 1170 can periodically determine which available technology to utilize as discussed above. Further, processor 1170 can formulate a reverse link message comprising a matrix index portion and a rank value portion.

The reverse link message can comprise various types of information regarding the communication link and/or the received data stream. The reverse link message can be processed by a TX data processor 1138, which also receives traffic data for a number of data streams from a data source 1136, modulated by a modulator 1180, conditioned by transmitters 1154a through 1154r, and transmitted back to base station 1110.

At base station 1110, the modulated signals from UE 1150 are received by antennas 1124, conditioned by receivers 1122, demodulated by a demodulator 1140, and processed by a RX data processor 1142 to extract the reverse link message transmitted by UE 1150. Further, processor 1130 can process the extracted message to determine which precoding matrix to use for determining the beamforming weights.

Processors 1130 and 1170 can direct (e.g., control, coordinate, manage, etc.) operation at base station 1110 and UE 1150, respectively. Respective processors 1130 and 1170 can be associated with memory 1132 and 1172 that store program codes and data. Processors 1130 and 1170 can also perform computations to derive frequency and impulse response estimates for the uplink and downlink, respectively.

In an aspect, logical channels are classified into Control Channels and Traffic Channels. Logical Control Channels can include a Broadcast Control Channel (BCCH), which is a DL channel for broadcasting system control information. Further, Logical Control Channels can include a Paging Control Channel (PCCH), which is a DL channel that transfers paging information. Moreover, the Logical Control Channels can comprise a Multicast Control Channel (MCCH), which is a Point-to-multipoint DL channel used for transmitting Multimedia Broadcast and Multicast Service (MBMS) scheduling and control information for one or several MTCHs. Generally, after establishing a Radio Resource Control (RRC) connection, this channel is only used by UEs that receive MBMS (e.g., old MCCH+MSCH). Additionally, the Logical Control Channels can include a Dedicated Control Channel (DCCH), which is a Point-to-point bi-directional channel that transmits dedicated control information and can be used by UEs having a RRC connection. In an aspect, the Logical Traffic Channels can comprise a Dedicated Traffic Channel (DTCH), which is a Point-to-point bi-directional channel dedicated to one UE for the transfer of user information. Also, the Logical Traffic Channels can include a Multicast Traffic Channel (MTCH) for Point-to-multipoint DL channel for transmitting traffic data.

In an aspect, Transport Channels are classified into DL and UL. DL Transport Channels comprise a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE, . . . ) by being broadcasted over an entire cell and being mapped to Physical layer (PHY) resources that can be used for other control/traffic channels. The UL Transport Channels can comprise a Random Access Channel (RACH), a Request Channel (REQCH), a Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and/or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PS-DCH); and/or Broadband Pilot Channel (BPICH).

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 12:
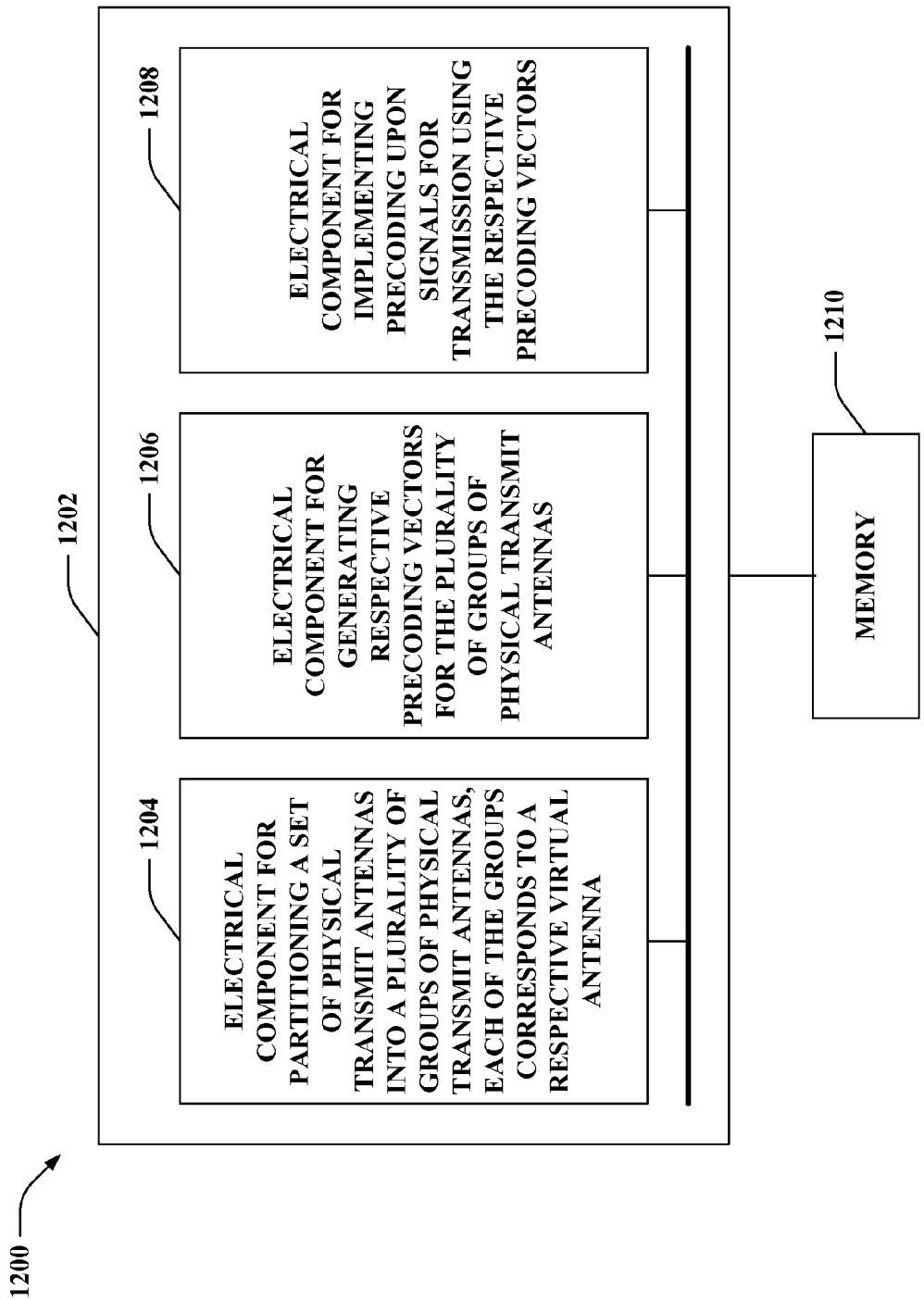
FIG. 12 is an illustration of an example system that enables effectuating antenna virtualization in a wireless communication environment.

With reference to FIG. 12, illustrated is a system 1200 that enables effectuating antenna virtualization in a wireless communication environment. For example, system 1200 can reside within a UE. By way of another example, system 1200 can reside at least partially within a base station. It is to be appreciated that system 1200 is represented as including functional blocks, which can be functional blocks that represent functions implemented by a processor, software, or combination thereof (e.g., firmware). System 1200 includes a logical grouping 1202 of electrical components that can act in conjunction. For instance, logical grouping 1202 can include an electrical component for partitioning a set of physical transmit antennas into a plurality of groups of physical transmit antennas 1204. Further, each of the groups can correspond to a respective virtual antenna. Moreover, logical grouping 1202 can include an electrical component for generating respective precoding vectors for the plurality of groups of physical transmit antennas 1206. Further, logical grouping 1202 can include an electrical component for implementing precoding upon signals for transmission using the respective precoding vectors 1208. Additionally, system 1200 can include a memory 1210 that retains instructions for executing functions associated with electrical components 1204, 1206, and 1208. While shown as being external to memory 1210, it is to be understood that one or more of electrical components 1204, 1206, and 1208 can exist within memory 1210.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates implementing antenna virtualization in a wireless communication environment, the method comprising:
    partitioning a set of physical transmit antennas into a plurality of groups of physical transmit antennas;
    advertising a number of virtual antennas corresponding to a number of the plurality of groups of physical transmit antennas to a legacy UE;
    advertising a number of physical transmit antennas in the set of physical transmit antennas to a non-legacy UE;
    formulating a precoding vector for a particular group of physical transmit antennas from the plurality of groups of physical transmit antennas, the particular group of physical transmit antennas forms a particular virtual antenna; and
    applying the precoding vector to a signal for transmission over the particular virtual antenna.

2. The method of claim 1, wherein the set of physical transmit antennas includes T physical transmit antennas, and the set of the T physical transmit antennas is partitioned into L groups of physical transmit antennas, wherein T is an integer and L is an integer less than or equal to T.

3. The method of claim 2, wherein L precoding vectors corresponding to L virtual antennas are formulated.

4. The method of claim 1, further comprising:
    formulating a disparate precoding vector for a disparate group of physical transmit antennas from the plurality of groups of physical transmit antennas, the disparate group of physical transmit antennas forms a disparate virtual antenna; and
    applying the disparate precoding vector to a disparate signal for transmission over the disparate virtual antenna.

5. The method of claim 1, wherein information related to antenna virtualization is transparent to the UEs.

6. The method of claim 1, wherein the precoding vector is a unit norm vector.

7. The method of claim 1, wherein the precoding vector is a unit norm vector with non-zero entries corresponding to physical transmit antennas in the particular group that participate in the particular virtual antenna.

8. The method of claim 1, wherein the precoding vector is a particular column of a Discrete Fourier Transform (DFT) matrix, wherein a disparate column of the DFT matrix is utilized for a disparate virtual antenna.

9. A wireless communications apparatus, comprising:
    a memory that retains instructions related to partitioning a set of physical transmit antennas into a plurality of groups of physical transmit antennas, advertising a number of virtual antennas corresponding to a number of the plurality of groups of physical transmit antennas to a legacy UE, advertising a number of physical transmit antennas in the set of physical transmit antennas to a non-legacy UE, generating a precoding vector for a particular group of physical transmit antennas from the plurality of groups of physical transmit antennas, wherein the particular group of physical transmit antennas forms a particular virtual antenna, and applying the precoding vector to a signal for transmission over the particular virtual antenna; and a processor, coupled to the memory, configured to execute the instructions retained in the memory.

10. The wireless communications apparatus of claim 9, wherein information related to antenna virtualization is transparent to a receiving wireless communication apparatus.

11. The wireless communications apparatus of claim 9, wherein the memory further retains instructions related to selecting a number of virtual antennas to form, wherein the number of virtual antennas is a number of the groups into which the set of physical transmit antennas is partitioned, and selecting the precoding vector for the particular group.

12. The wireless communications apparatus of claim 9, wherein the precoding vector is a unit norm vector with non-zero entries corresponding to physical transmit antennas in the particular group that participate in the particular virtual antenna.

13. The wireless communications apparatus of claim 12, wherein the non-zero entries in the precoding vector are constant.

14. The wireless communications apparatus of claim 12, wherein the non-zero entries in the precoding vector are at least one of frequency dependent or time dependent.

15. The wireless communications apparatus of claim 9, wherein the precoding vector is a particular column of a Discrete Fourier Transform (DFT) matrix, wherein a disparate column of the DFT matrix is utilized for a disparate virtual antenna.

16. A wireless communications apparatus that enables effectuating antenna virtualization in a wireless communication environment, comprising:

means for partitioning a set of physical transmit antennas into a plurality of groups of physical transmit antennas, each of the groups corresponds to a respective virtual antenna;

means for advertising a number of the plurality of groups of physical transmit antennas to a legacy UE;

means for advertising a number of physical transmit antennas in the set of physical transmit antennas to a non-legacy UE;

means for generating respective precoding vectors for the plurality of groups of physical transmit antennas; and means for implementing precoding upon signals for transmission using the respective precoding vectors.

17. The wireless communications apparatus of claim 16, wherein the respective precoding vectors are respective unit norm vectors.

18. The wireless communications apparatus of claim 16, wherein the respective precoding vectors are respective columns of a Discrete Fourier Transform (DFT) matrix.

19. The wireless communications apparatus of claim 16, wherein information related to antenna virtualization is transparent to a receiving wireless communication apparatus.

20. A computer program product, comprising:
a computer-readable medium comprising:
code for partitioning a set of physical transmit antennas into a plurality of groups of physical transmit antennas, each of the groups corresponds to a respective virtual antenna;
code for advertising a number of the plurality of groups of physical transmit antennas to a legacy UE;
code for advertising a number of physical transmit antennas in the set of physical transmit antennas to a non-legacy UE;
code for generating respective precoding vectors for the plurality of groups of physical transmit antennas; and
code for implementing precoding upon signals for transmission using the respective precoding vectors.

21. The computer program product of claim 20, wherein the respective precoding vectors are respective unit norm vectors with non-zero entries corresponding to physical transmit antennas that respectively form each respective virtual antenna.

22. The computer program product of claim 20, wherein the respective precoding vectors are respective columns of a Discrete Fourier Transform (DFT) matrix.

23. The computer program product of claim 20, wherein information related to antenna virtualization is transparent to a receiving wireless communication apparatus.

24. A wireless communications apparatus, comprising:
a processor configured to:
partition a set of physical transmit antennas into a plurality of groups of physical transmit antennas;
advertise a number of virtual antennas corresponding to a number of the plurality of groups of physical transmit antennas to a legacy UE;
advertise a number of physical transmit antennas in the set of physical transmit antennas to a non-legacy UE;
formulate a precoding vector for a particular group of physical transmit antennas from the plurality of groups of physical transmit antennas, the particular group of physical transmit antennas forms a particular virtual antenna; and
apply the precoding vector to a signal for transmission over the particular virtual antenna.

* * * * *